United States Patent [19]

Fielding et al.

[11] Patent Number: 5,953,051

[45] Date of Patent: Sep. 14, 1999

[54] METHOD AND APPARATUS FOR CONTROLLING ACCESS IN A VIDEO DISTRIBUTION NETWORK

[75] Inventors: William S. Fielding; Christopher R. Plater, both of Vancouver, Canada

[73] Assignee: International Business Machines Corporation, Armonk, N.Y.

[21] Appl. No.: 08/904,776

[22] Filed: Aug. 1, 1997

[51] Int. Cl.$^6$ .................................................. H04N 7/14
[52] U.S. Cl. .............................. 348/15; 348/7; 709/217
[58] Field of Search ..................... 345/327; 348/15–19, 348/13–14; 379/93.02; 370/260, 261, 265; 395/200.34–200.37, 200.47, 200.57; 709/217; H04N 7/14, 7/15

[56] References Cited

U.S. PATENT DOCUMENTS

| | | |
|---|---|---|
| 4,710,917 | 12/1987 | Tompkins et al. .................. 370/62 |
| 5,343,240 | 8/1994 | Yu .................................... 348/14 |
| 5,491,797 | 2/1996 | Thompson et al. ............ 395/200.03 |
| 5,631,904 | 5/1997 | Fitser et al. .................... 370/261 |
| 5,784,561 | 7/1998 | Bruno et al. ................ 395/200.34 |

*Primary Examiner*—Andrew I. Faile
*Assistant Examiner*—Uyen Le
*Attorney, Agent, or Firm*—Peter Tennent

[57] ABSTRACT

A method and apparatus are provided for use in a video transmission network having a number of sites, identified in a database associated with the network, from which video information can be transmitted or to which video information can be sent for controlling access of selected sites in the network to other sites in the network by associating selected sites with each other by grouping the sites into a site group in accordance with preselected criteria; identifying the associated sites by identification information stored in the database for the sites; associating a subscriber with a selected site group in accordance with preselected criteria; and granting access to each subscriber to all sites within the selected site group with which it is associated.

16 Claims, 6 Drawing Sheets

| 03-Aug-95 | WAVE(TM) Configuration Management | 02:54 pm |

─── CREATE/MODIFY A SITE GROUP ───

[SITE GROUP]   NAME    : [        ]   GROUP ID:

[INFORMATION]  REMARKS   :
               CONTACT   :
               TELEPHONE : (   ) -

[CBT LIST]     [                              ]

F2=CHOICES  F4-ENTER FORM  F6=BELL OFF  F7-REFRESH  F8=MSGS

FIG. 6

| 03-Aug-95 | WAVE(TM) Configuration Management | 02:41 pm |

─── CONFIGURATION MANAGEMENT SYSTEM ───

[1]. O&M   [2]. CONFIGURATION   [3]. ABOUT CMS   [4]. EXIT

[1]. APPLICATION   [2]. NETWORK   [3]. SUBSCRIBER

F6=BELL OFF    F7-REFRESH DISPLAY    F8=MESSAGES

FIG. 7A

| Subscriber |
|---|
| 1 |
| 2 |
| 3 |
| 4 |

FIG. 7B

| Site Group | Subscriber |
|---|---|
| 1 | 1 |
| 2 | 1 |
| 3 | 3 |
| 4 | 4 |

FIG. 7C

| Site |
|---|
| 1 |
| 2 |
| 3 |
| 4 |
| 5 |
| 6 |
| 7 |

FIG. 7D

| Site | Site Group |
|---|---|
| 1 | 1 |
| 2 | 1 |
| 3 | 1 |
| 1 | 2 |
| 4 | 2 |
| 5 | 2 |
| 6 | 3 |
| 7 | 4 |
|  |  |

FIG. 7E

| Site Group |
|---|
| 1 |
| 2 |
| 3 |
| 4 |

| Subscriber |
|---|
| 1 |
| 2 |
| 3 |
| 4 |

FIG. 8B

| Site Group | Subscriber |
|---|---|
| ① | 1 |
| ② | 1 |
| 3 | 3 |
| 4 | 4 |

| Site |
|---|
| 1 |
| 2 |
| 3 |
| 4 |
| 5 |
| 6 |
| 7 |

| Site | Site Group |
|---|---|
| 1 | ① |
| 2 | ① |
| 3 | ① |
| 1 | ② |
| 4 | ② |
| 5 | ② |
| 6 | 3 |
| 7 | 4 |

| Site Group |
|---|
| 1 |
| 2 |
| 3 |
| 4 |

| Sites |
|---|
| 1 |
| 2 |
| 3 |
| 4 |
| 5 |
| 6 |
| 7 |

FIG. 9B

| Site | Site Group |
|---|---|
| 1 | 1 |
| 2 | 1 |
| 3 | 1 |
| 1 | 2 |
| 4 | 2 |
| 5 | 2 |
| 6 | 3 |
| 7 | 4 |
| 1 | 5 |
| 3 | 5 |
| 5 | 5 |
| 7 | 5 |

| Site Group |
|---|
| 1 |
| 2 |
| 3 |
| 4 |
| 5 |

| Subscriber |
|---|
| 1 |
| 2 |
| 3 |
| 4 |

FIG. 9E

| | |
|---|---|
| 1 | 1 |
| 2 | 1 |
| 3 | 3 |
| 4 | 4 |
| 5 | 2 |

METHOD AND APPARATUS FOR CONTROLLING ACCESS IN A VIDEO DISTRIBUTION NETWORK

CROSS REFERENCES TO RELATED PATENT APPLICATION

The following patent applications:

| S/N | Title | IBM Docket No. |
|---|---|---|
| 08/904,813 | Multiplexer for Multiple Media Streams | CA 97 025a |
| 08,904,773 | Method and Apparatus for Controlling Elementary Stream Data Flow | CA 97 025b |
| 08,904,819 | Frame Buffer for Multimedia Terminal | CA 97 026 |
| 08,904,778 | Isolation of Multimedia Signals for Transmission and Processing Within a Multimedia Terminal | CA 97 027 |
| 08,905,197 | Internet Application Access Server Apparatus and Method | CA 97 031 |
| 08,904,493 | Network Communication Services Method and Apparatus | CA 97 034 |
| 08,904,774 | Method and Apparatus for Maintaining Directory Services for a Video Transmission Network | CA 97 035 |
| 08,904,775 | Method and Apparatus for Controlling Network Switches | CA 97 037 |
| 08,904,872 | Method and Apparatus for Controlling a Mixed Network of Analog and Digital Switches | CA 97 038 | are related to this patent application and are incorporated herein by reference.

FIELD OF THE INVENTION

This invention relates to the video telecommunication distribution field and in particular to methods and apparatus for managing access in a video conferencing or video broadcasting network of a number of terminals by using site groups and associating subscribers with these site groups.

BACKGROUND OF THE INVENTION

Information handling networks have dramatically increased in size, and complexity especially with the increased volume of use and the increased complexity of communications and data processing that are done on the networks. One of the more complex areas which are rapidly expanding are the telecommunications networks which now are opening up into the video arena and providing video conferencing and video broadcasting services usually over broadband networks in North America and elsewhere.

Because of the size of the networks involved and the volume of audio video information being transmitted it has been found that the network arrangement used by the telecommunications industry in permitting every subscriber on a network make contact with all other subscribers on the network (e.g. everyone having a phone can call anyone else having a phone if the corresponding telephone number is used) may not be suitable. While it is highly desirable that an existing and rapidly expanding general access telecommunications network such as those managed by the telephone companies or Internet be used for audio video transmission it is not desirable that everyone who has access to the network can access the video transmission of another party. It would also impose inefficiencies on control of the network if a database with which subscribers are registered would contain the entire list of sites and subscribers in the network.

For instance, while the telecommunication networks appear to be suitable for the handling of broadcast television programs the restricting of access to the programs is critical to the television networks among others. If one network was able to access the sites of the other networks on an uncontrolled basis, the use of the network would pose a severe security and financial risk to the parties concerned. Similarly, in the video conferencing area, one company broadcasting a videoconference or hosting a video conference would not appreciate it if other uninvited parties could access the video conference uninvited.

At the present time the control of access is frequently accomplished by manual intervention using conference operators, in the case of conferencing applications, to set up the conferences and control access.

SUMMARY OF THE INVENTION

The invention herein overcomes the above difficulties by providing method and apparatus utilizing site groups and subscriber association with the site groups to control access to the network being used. As a result of the use of the present invention the network, which may be vast in size, appears smaller to its users as they are only permitted to view selected parts of the network. As different groups of users are granted different access the network would look different to the different groups.

One aspect of the invention when used in a video transmission network having a plurality of sites, identified in a database associated with the network, from which video information can be transmitted or to which video information can be sent, a method of controlling access of selected sites in the network to other sites in said network, comprising:

associating selected sites with each other by grouping the sites into a site group in accordance with preselected criteria;

identifying the associated sites by identification information stored in the database for the sites;

associating a subscriber with a selected site group in accordance with preselected criteria; and granting access to each subscriber to all sites within the selected site group with which it is associated.

Advantageously, a plurality of site groups are established from sites within the network, associating a subscriber with each site of said site groups; granting access to each subscriber to all sites within the site group of which its site is a member.

A site may be associated with a plurality of preselected site groups, whereby a subscriber associated with any of said preselected site groups is granted access to all sites within said plurality of preselected site groups.

A site may be associated with a plurality of preselected site groups, whereby a subscriber associated with any of the preselected site groups is granted access to all sites within the union of the plurality of preselected site groups.

A broker site group may be associated with a plurality of preselected site groups, whereby a subscriber associated with a broker site within the broker site group is granted access to all sites within the plurality of preselected site groups.

In yet another embodiment subscribers associated with the preselected site groups other than said broker site are only granted access to site groups of which they are members.

A site directory may be maintained for each site group identifying the sites of which the site group is comprised.

In another aspect of the invention used in a video transmission network having a plurality of sites, identified in a database associated with the network, from which video information can be transmitted or to which video information can be sent, a method of controlling access of selected sites in said network to other sites in the network, comprising:

associating selected sites with each other by grouping the sites into multiple site groups in accordance with preselected criteria;

identifying the associated sites by identification information stored in the database for the sites;

associating a subscriber with one or more selected site groups in accordance with preselected criteria; and granting access to each subscriber to all sites within the selected multiple site groups with which it is associated.

Another aspect of the invention provides a program storage device readable by a machine, tangibly embodying a program of instructions executable by the machine to perform method steps for a video transmission network having a plurality of sites, identified in a database associated with the network, from which video information can be transmitted or to which video information can be sent, for controlling access of selected sites in the network to other sites in the network, comprising:

associating selected sites with each other by grouping the sites into a site group in accordance with preselected criteria;

identifying the associated sites by identification information stored in the database for the sites;

associating a subscriber with a selected site group in accordance with preselected criteria; and granting access to each subscriber to all sites within the selected site group with which it is associated.

The program of instructions may be adapted to perform the method in which a plurality of site groups are established from sites within the network, including associating a subscriber with each site of site groups; granting access to each subscriber to all sites within the site group of which its site is a member.

The program of instructions may be adapted to perform the method in which a site is associated with a plurality of preselected site groups, whereby a subscriber associated with any of the preselected site groups is granted access to all sites within the plurality of preselected site groups.

The program of instructions may be adapted to perform the method in which a site is associated with a plurality of preselected site groups, whereby a subscriber associated with any of the preselected site groups is granted access to all sites within the union of the plurality of preselected site groups.

The program of instructions may be adapted to perform the method in which a broker site group is associated with a plurality of preselected site groups, whereby a subscriber associated with a broker site within said broker site group is granted access to all sites within the plurality of preselected site groups.

The program of instructions may be adapted to perform the method wherein subscribers associated with the preselected site groups other than the broker site are only granted access to site groups of which they are members.

The program of instructions to perform the method in which a site directory is maintained for each site group identifying the sites of which the site group is comprised.

Another aspect provides a program storage device readable by a machine, tangibly embodying a program of instructions executable by the machine to perform method steps for a video transmission network having a plurality of sites, identified in a database associated with said network, from which video information can be transmitted or to which video information can be sent, for controlling access of selected sites in said network to other sites in said network, comprising:

associating selected sites with each other by grouping said sites into multiple site groups in accordance with preselected criteria;

identifying said associated sites by identification information stored in said database for said sites;

associating a subscriber with one or more selected site groups in accordance with preselected criteria; and granting access to each subscriber to all sites within said selected multiple site groups with which it is associated.

BRIEF DESCRIPTION OF THE DRAWINGS

The present invention will be more fully understood by reference to the following detailed description, which should be reviewed with the accompanying drawings in which.

DETAILED DESCRIPTION OF THE INVENTION

Figure 1:
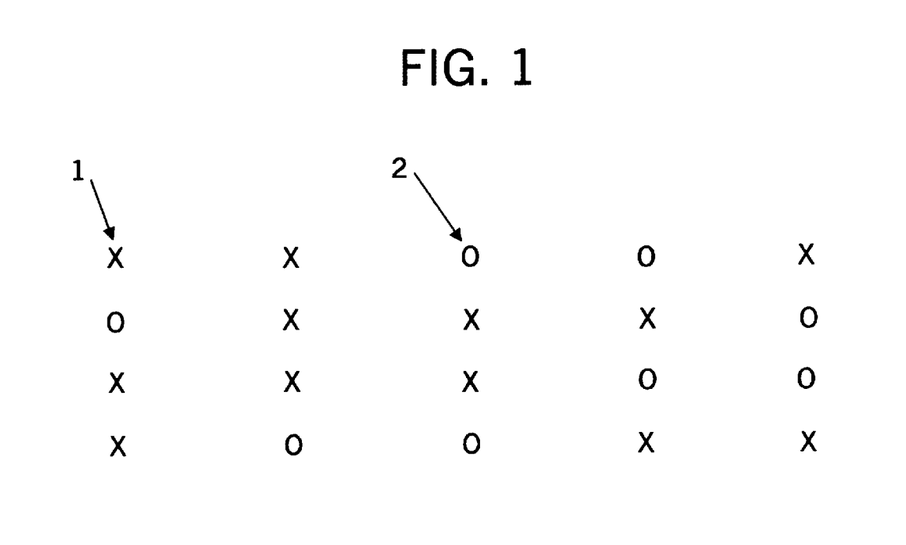
FIG. 1 depicts a network of a number of sites.

Referring to FIG. 1 which depicts a video transmission network (without interconnections being shown) that can be operated by a telecommunications company, it can be seen that a number of sites 1, 2 are depicted. For the purposes of this illustration it could be visualized that the sites 1, labelled as x's are station sites belonging to one television network and those with o's being station sites belonging to another television network. Other than the visual indication shown there does not appear to be any limitation as to which sites can communicate with, or view, which other sites.

Figure 2:
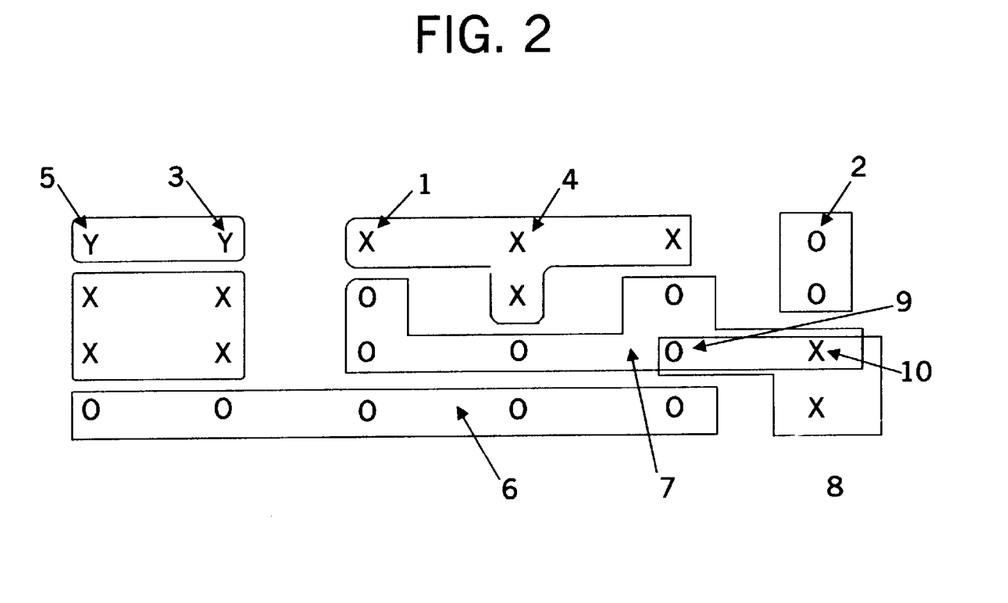
FIG. 2 depicts a conceptual view of a site directory depicting simple site grouping.

Referring to FIG. 2 it can now be appreciated that we can establish site groups 4, 5, 6 within which members of the site groups can communicate. Site group 4 can be considered as one grouping of television stations or a group of locations of a company having video terminals at different locations. Similarly for site group 6, which can represent television stations of another television network, or another company at locations of that other company. Under the invention herein subscribers at one site can only see subscribers at sites within the site group of which the site they are associated with are members. Although all of the sites are operated on the same network, the sites have different access to (i.e.. views of) the network. A site can only access other sites that belong to its same site group. Site group 5 may represent a broker site which has access to other site groups, but sites of the site groups to which the broker site has access do not have access to other site groups.

Referring again to FIG. 2 it can be seen that site groups 7 and 8 have two member sites in common, 9, 10. In the situation depicted, the sites that are members of overlapping groups have access only to sites in their overlapping areas (the union), I.e. sites 9 and 10 can only access each other in their respectively overlapped areas, but each can access sites of its own group, I.e. site 9 can access members of group 7 and vice versa; while site 10 can access the other site in group 8.

Figure 3:
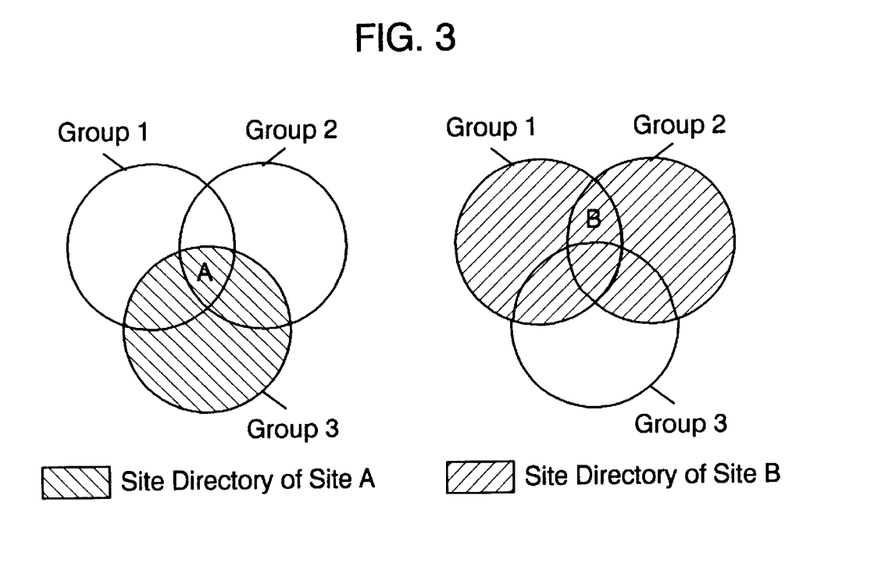
FIG. 3 depicts a conceptual view of a site directory depicting more complex site grouping illustrating several site groups.
Figure 4:
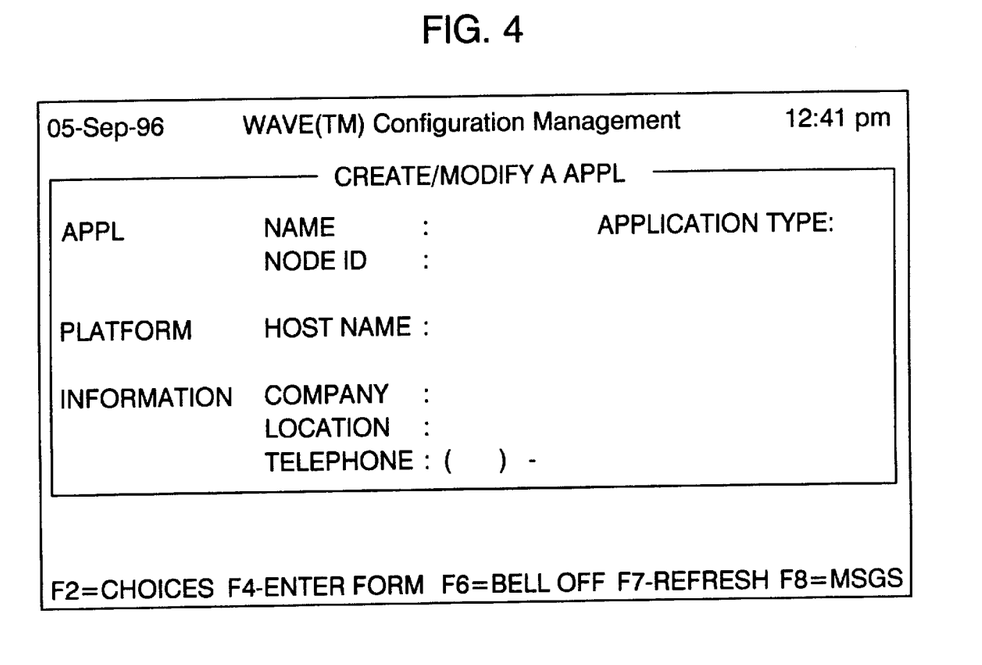
FIG. 4 illustrates a user interface for assisting in the creation and modification of a Site Group.
Figure 5:
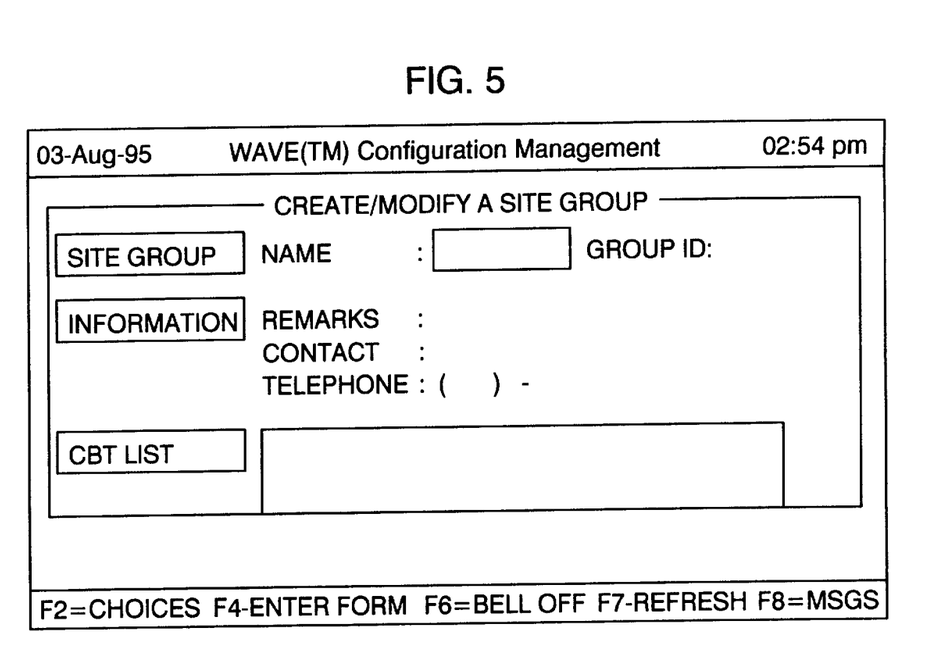
FIG. 5 illustrates a user interface for assisting in the creation and modification of Subscriber.

Referring to FIG. 3 another illustration is shown in which it can be seen that the sites to which site A has access in its directory of sites to which it has access include the sites of Groups 1, 2 and 3; whereas Site B clearly falls outside of Group 3 and consequently only includes the sites of Groups 1, and 2 within its directory.

Maintaining Site Groups

As stated above, site groups are intended to control access to Terminal sites. Each Terminal site must be included in at least one site group. If not, the site will not appear in a site directory, and no calls or broadcasts can be scheduled for that site.

In this example, a site group can contain up to 50 sites and 15 Call Booking Terminals (CBTs). A site may be included in any number of site groups. If a site appears in more than one group, its site directory will include all sites from each group, as illustrated in FIG. 3.

Requirements

Define the Terminal sites you are including in the site groups in the database. See Maintaining Terminal Sites below. A Terminal site may be added by modifying the site group.

Figure 6:
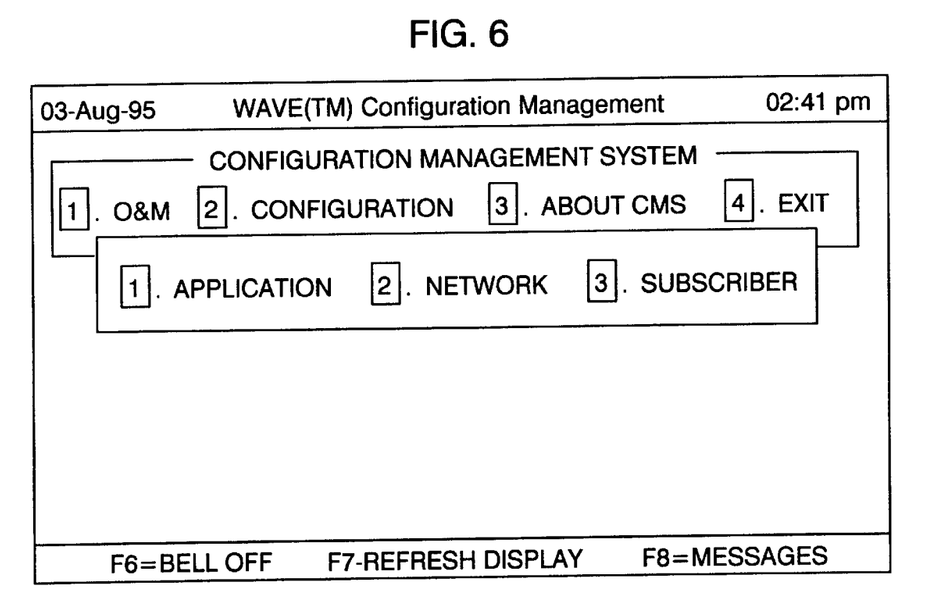
FIG. 6 illustrates a configuration menu used as a user interface for managing configuration of the relevant network.
Figure 7A:
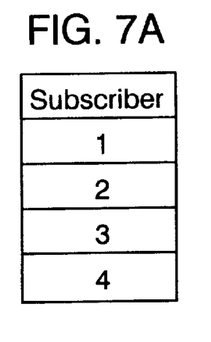
FIG. 7 illustrates the relationship of subscribers, sites and site groups to each other as represented by a relational database, depicting a typical network.
Figure 7B:
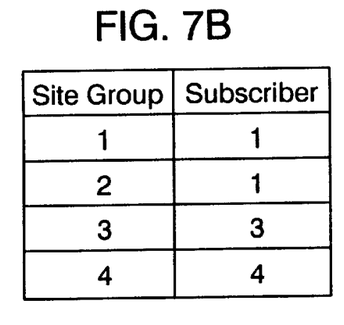
Figure 7C:
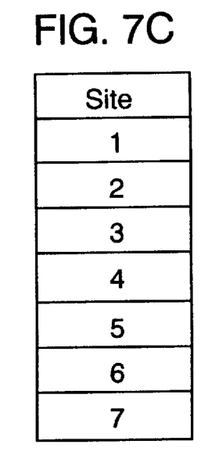
Figure 7D:
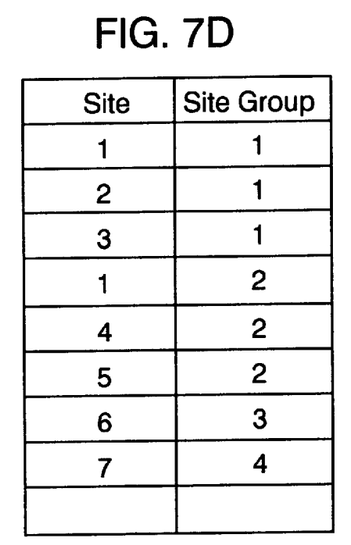
Figure 7E:
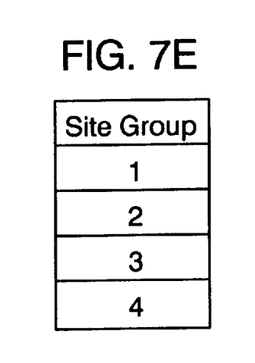
Figure 7F:
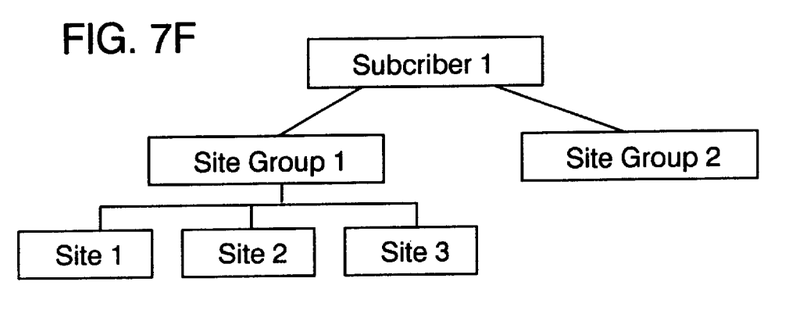

Find these displays:
Procedure
Select Application from the Configuration sub-menu FIG. 6, then Site, Group, Create.
Modifying a Site Group
Select Application from the Configuration sub-menu, then Site, Group, Create.
Press Enter to move the cursor to the field you want to modify.
Removing a Site Group Record
Select Application from the Configuration sub-menu, then Site, Group, Remove.
Listing Site Groups
Select Application from the Configuration sub-menu, then Site, Group, List.

Viewing Site Group Information
Select Application from the Configuration sub-menu, then Site, Group, View.
Use Up Arrow and Down Arrow to scroll through the information.
Site Group Field Descriptions
Following is a description of the site group fields that may be maintained in a suitable database. The fields are listed in the order in which they appear on the Create/Modify screen, and are common to all site group screens.

TABLE 1

Site Group Fields

| Field | Description | Required? |
| --- | --- | --- |
| Name | Name used to identify the site group; alphanumeric, 14 characters. Once the group is created, you cannot change this field. To change the name, remove the record, then re-define the site group. When entering the name of an existing site group, you can press F2 to display a choice list. | Y |
| Group ID | Number that uniquely identifies the site group; 4 digits | Y |
| Remarks | Alphanumeric, 38 characters | N |
| Contact | Name of the contact at the company; alphanumeric, 20 characters. | N |
| Telephone | Numeric. | N |
| CBT List | CBTs in the site group. | N |
| Terminal Site List | Terminal sites in the site group. | N |

List Site Groups
The following field only appears when you use the List command.

TABLE 2

List Site Field

| Field | Description |
| --- | --- |
| Site Count | Total number of sites in the site group. The maximum is 50 |
| CBT Count | Total number of CBTs in the site group. The maximum is 15. |

Maintaining Subscriber Information
Creating a Subscriber
Requirements
The subscriber should be defined in a subscriber database.
Procedure
Select Subscriber from the Configuration sub-menu, then Sub, Create.
Modifying a Subscriber
Select Subscriber from the Configuration sub-menu, then Sub, Create.
Use Enter to move the cursor to the field you want to modify.
Removing a Subscriber
Select Subscriber from the Configuration sub-menu, then Sub, Remove.
Listing a Subscriber
Select Subscriber from the Configuration sub-menu, then Sub, List.
Viewing a Subscriber
Select Subscriber from the Configuration sub-menu, then Sub, View.
Use the Up Arrow and Down Arrow keys to scroll through the Subscriber information.

Subscriber Field Descriptions

Following is a description of the Subscriber fields that are maintained in the WAVE database. The fields are listed in the order in which they appear on the Create/Modify screen, and are common to all Subscriber screens.

TABLE 3

Subscriber Fields

| Field | Description | Required |
|---|---|---|
| Name | Name used to identify the site group; alphanumeric, 14 characters. Once the group is created, you cannot change this field. To change the name, remove the record, then re-define the site group. When entering the name of an existing site group, you can press F2 to display a choice list. | Y |
| Subscriber ID | Number that uniquely identifies the subscriber; 4 digits. | Y |
| Type | Always choose CUST. | Y |

TABLE 4

Subscriber Fields

| Field | Description | Required |
|---|---|---|
| Password | Subscriber password; alphanumeric, 14 characters | Y |
| Site Group | Specify the four site groups whose member Terminal sites and APPL (CBT) device can log in as this subscriber. | Y |
| Company | Alphanumeric, 14 characters | N |
| Address | Alphanumeric, 38 characters | N |
| Remarks | Alphanumeric, 38 characters | N |
| Contact | Alphanumeric, 20 characters | N |
| Telephone | Numeric. | N |
| Fax | Numeric. | N |

View Fields

The following field only appears when you use the View command.

TABLE 5

View Fields

| Field | Description |
|---|---|
| CBT Device | List of APPL (CBT) which may log in as this subscriber. |
| Node ID | Node ID of the CBT. |
| Site | List of Terminal sites whose devices can log in as this subscriber. |
| Site ID | Site ID. |

Referring to FIG. 7 which depicts the relational aspects of a network composed of sites, site groups and subscribers to each other. This information can be stored in a database of the network, preferably a relational database. FIG. 7(a) is a list of subscribers; while FIG. 7(b) illustrates the relationship of subscribers to site groups to which they have access. FIG. 7(c) lists the available sites in the network; while 7(d) illustrates the relationship of sites to site groups in the network. FIG. 7(e) lists the site groups in the network. FIG. 7(b) is a representation of the relationship of subscriber 1 to its related site groups and sites. As will be well recognized each site, site group, and subscriber will have a unique ID associated with it. No further detail is considered necessary for those skilled in the art to understand and apply this invention.

The following illustration will depict the process of building a site group using the network of FIG. 7 to obtain the relationship depicted in FIG. 8, e.g. to assemble a site group with all sites belonging to a company so that the company sites may access and communicate with each other.

The network configuration or management software is provided with routines for maintaining and modifying the configuration of the network with respect to sites, site groups, and subscribers.

1. To commence the operation of building a site group a user is required to log in as a particular subscriber of a site, and then requests a list of sites to which calls can be booked, communication can be established.

2. The user's subscriber ID is provided to the routine which will assemble the site list.

3. The network database contains a table which relates the site groups to the subscribers (see FIG. 7(b)). The routine which assembles the site list selects (using Select statement A, illustrated in FIG. 8(d)) all entries from this table whose subscriber ID (1 in this example) matches the user's subscriber ID. The result is a list 41 of all site group IDS (1,6) associated with the given subscriber ID.

Figure 8A:
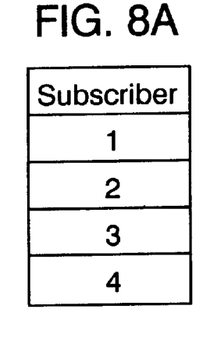
FIG. 8 illustrates the relationship of subscribers, sites and site groups when building a site group in a network as described in FIG. 7.
Figure 8B:
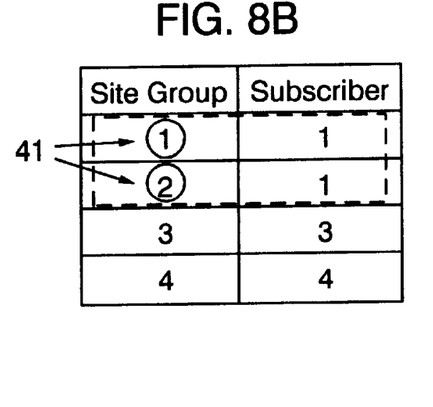
Figure 8C:
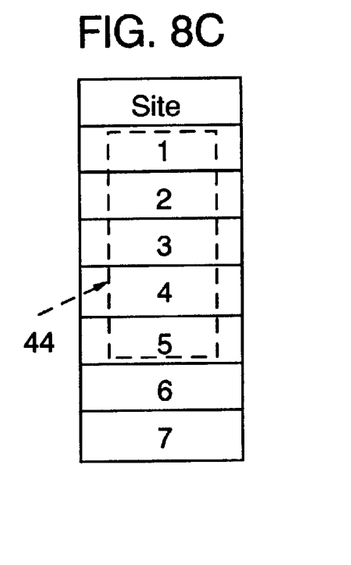
Figure 8D:
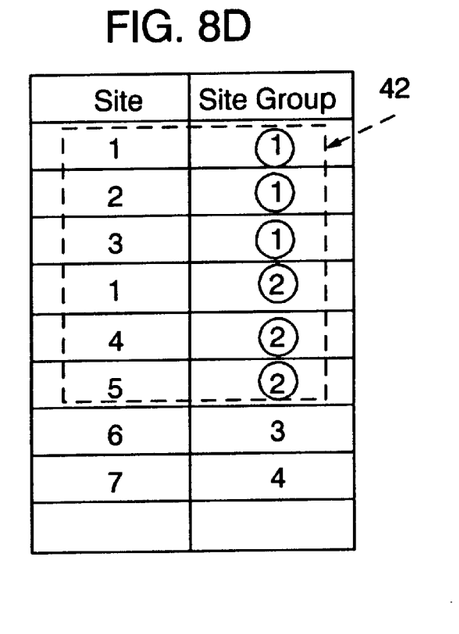
Figure 8E:
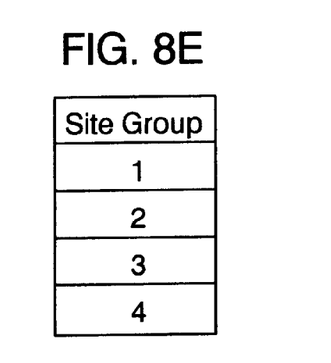

4. The database also contains a table 42 which relates the sites to the site group IDS the routine which assembles the site list selects all entries from this table whose site group IDS (1,2) appear in the list generated in the previous step. These entries are found in the left hand column "sites" and include 1,2,3,4,5 as highlighted.

5. The list 44 generated in the previous step is the required list of sites, and is returned to the client user.

Figure 8F:
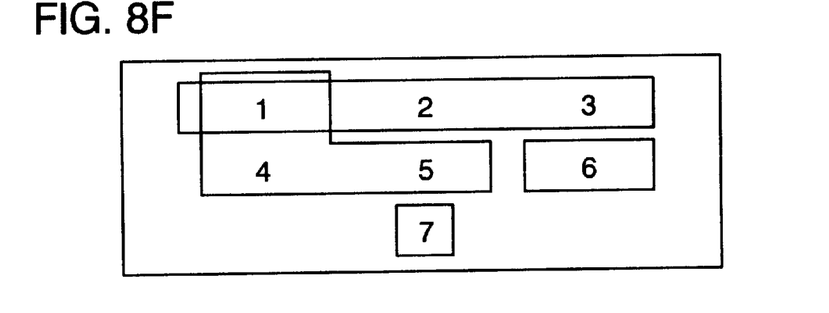

FIG. 8(f) is a topical illustration of the site groups of the network as established above.

Referring to FIG. 9 the process for adding a site group 5 with site members 1,3,5,7.

Network routines are provided for adding entries concerning sites, site groups and subscribers to the network database.

To add a new site group 5 having sites 1,3,5,7 the routine of the network is as follows:

a. A new entry 52 is added to the list of Site Groups in the database.

b. A new entry 51 to the Site- Site Group table is added for each site (1,3,5,7) desired by the user to be in the new Site Group.

c. These entries will result in the appearance of a new site group in the Site Group column of the database and the ID's of the sites associated with the new site group in the site ID column.

d. New entries 53 that relate the new site group to the relevant subscribers will be added to site group-subscriber table.

Figure 9A:
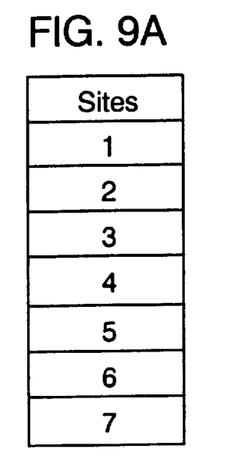
FIG. 9 illustrates the process of adding a site group to the network of FIG. 8.
Figure 9B:
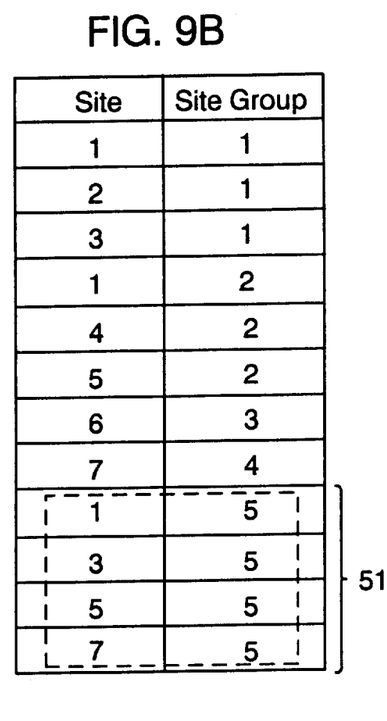
Figure 9C:
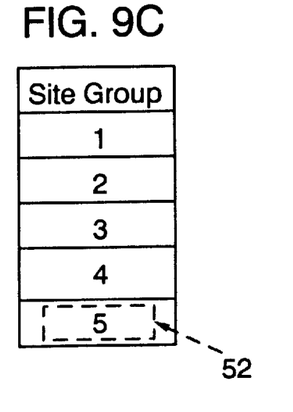
Figure 9D:
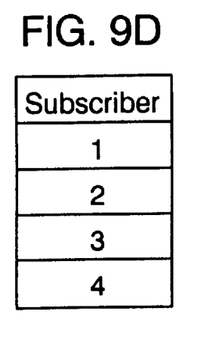
Figure 9E:
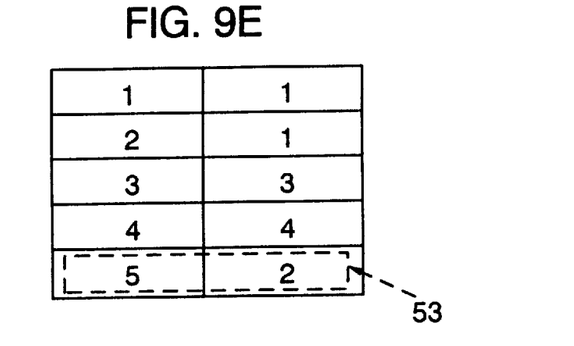
Figure 9F:
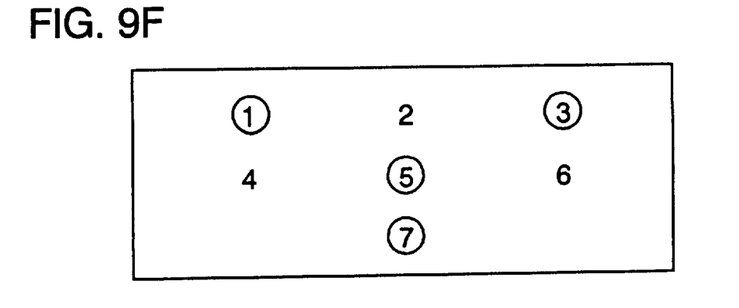

FIG. 9(f) illustrates sites that are in site group 5 that was added.

While the above is a complete description of the preferred embodiment of the present invention it will be well known in the art that it is possible to use various alternatives, modifications, and equivalents. Therefore, the scope of the present invention should be determined with reference to the claims with their full scope of equivalents.

What is claimed is:

1. In a video transmission network having a plurality of sites that are identified in a database associated with said network, from which sites video information can be transmitted or to which sites video information can be sent, a method of controlling access to selected sites in said network from other sites in said network comprising:

associating selected sites of said plurality of sites with each other by grouping said sites into a plurality of multiple site groups in accordance with preselected criteria;

identifying said associated sites by group identification information for the site groups stored in said database for said sites;

restricting access to sites in any site group to selected sites associated by identification information for the site;

associating subscribers by subscriber identification information stored in said database with one of more selected site groups in accordance with preselected criteria to limit access to the site group; and granting access to each subscriber to access all sites within any of said selected multiple site groups with which that subscriber is associated with by the subscriber identification information.

2. The method of claim 1 including associating a subscriber with each site of one of said site groups; granting access to each subscriber to all sites within the site group of which the site which the subscriber is associated with is a member.

3. The method of claim 2 in which a site is associated with a plurality of preselected site groups, whereby a subscriber associated with any of said preselected site groups is granted access to all sites within said plurality of preselected site groups.

4. The method of claim 1 providing a union of sites of a plurality of preselected site groups and allowing a subscriber when associated with any of said preselected site groups access to all sites within the union of said plurality of preselected site groups.

5. The method of claim 1 including providing a broker site group associated with a plurality of preselected site groups, allowing a subscriber associated with a broker site within said broker site group access to all sites within said plurality of preselected site groups.

6. The method of claim 5 wherein other subscribers associated with said preselected site groups other than said broker site are only granted access to site groups of which they are members.

7. A program storage device readable by a machine, tangibly embodying a program of instructions executable by the machine to perform method steps for a video transmission network having a plurality of sites that are identified in a database associated with said network, from which sites video information can be transmitted or to which sites video information can be sent, for controlling access of selected sites in said network to other sites in said network, program storage device comprising:

software code for associating selected sites with each other by grouping said sites into multiple site groups in accordance with preselected criteria;

software code for identifying said associated sites by group identification information stored in said database for said sites;

software code for associating subscribers with one or more selected site groups, by subscriber identification information stored in said database, in accordance with preselected criteria for limiting access to the selected site groups to subscribers associated with the site groups; and software code for granting access to each subscriber to all sites within said selected multiple site groups with which such subscriber is associated by subscriber identification information in said database.

8. The program storage device of claim 7 including software code for providing computer screens for use in establishing a plurality of site groups from sites within said network and associating a subscriber with each site of said site groups; and software code responsive to entries in the screen for granting access to each subscriber to all sites within the site group of which its site is a member.

9. The program storage device of claim 8 including software code for granting, from a site associated with a plurality of preselected site groups, a subscriber, associated with any of said preselected site groups, access to all sites within said plurality of preselected site groups.

10. The program storage device of claim 8 including software code for granting, from a site is associated with a union of plurality of preselected site groups, a subscriber, associated with any of said preselected site groups, access to all sites within the union of said plurality of preselected site groups.

11. The program storage device of claim 8 including software code providing for a broker site group associated with a plurality of preselected groups and for granting a subscriber associated with a broker site within said broker site group access to all sites within said plurality of preselected site groups.

12. A video transmission network having a plurality of sites that are identified in a database associated with said network, from which sites video information can be transmitted or to which sites video information can be sent, a means for controlling access of selected sites in said network to other sites in said network, comprising:

means for associating selected sites with each other by grouping said sites into multiple site groups in accordance with preselected criteria;

means for identifying said associated sites by identification information stored in said database for said sites;

means for associating subscribers with one or more selected site groups in accordance with preselected criteria; and means for granting access only to subscribers to sites within said selected multiple site groups with which the subscribers are associated, each subscriber to all sites with which that subscriber is so associated.

13. The network of claim 12 including: a relational database for associating a subscriber with each site of said site groups; and means responsive to the relational database for granting access to each subscriber to all sites within the site group of which its site is a member.

14. The network of claim 12 including a shared site associated with a plurality of preselected site groups, whereby a subscriber associated with the shared site in any of said preselected site groups is granted access to all sites within said plurality of preselected site groups.

15. The network of claim 13 including a broker site group associated with a plurality of preselected site groups, whereby a subscriber associated with a broker site within said broker site group is granted access to all sites within said plurality of preselected site groups.

16. The network of claim 13 including create/modify view screens for establishing and maintaining said site groups, said view screens including for each site group a site group field identifying the sites in that site group and subscriber fields identifying subscribers to that site group.

* * * * *